May 23, 1950 E. RATHJE, JR 2,508,468
CONTOUR REPRODUCTION
Filed June 19, 1946 2 Sheets-Sheet 2
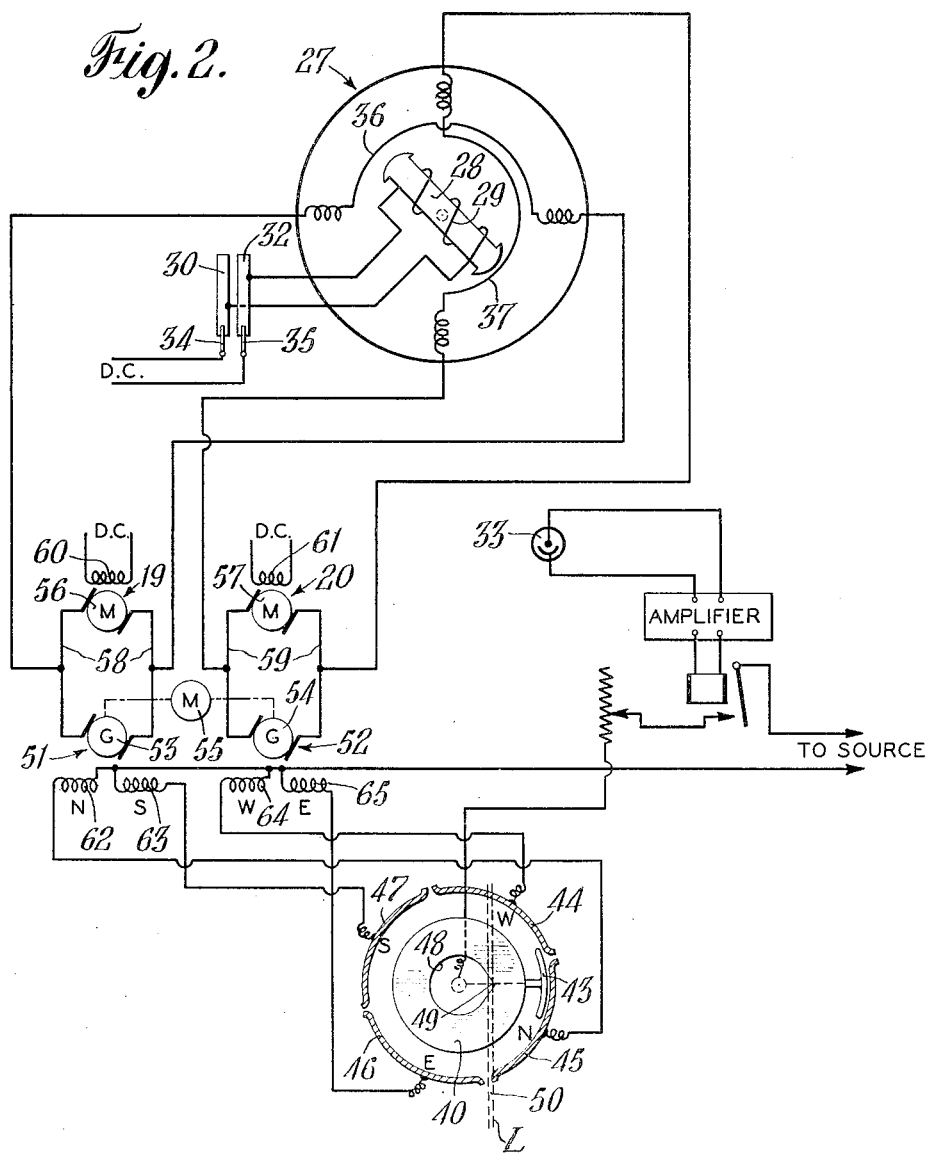
INVENTOR
EDWARD RATHJE, JR.
BY
ATTORNEY Patented May 23, 1950

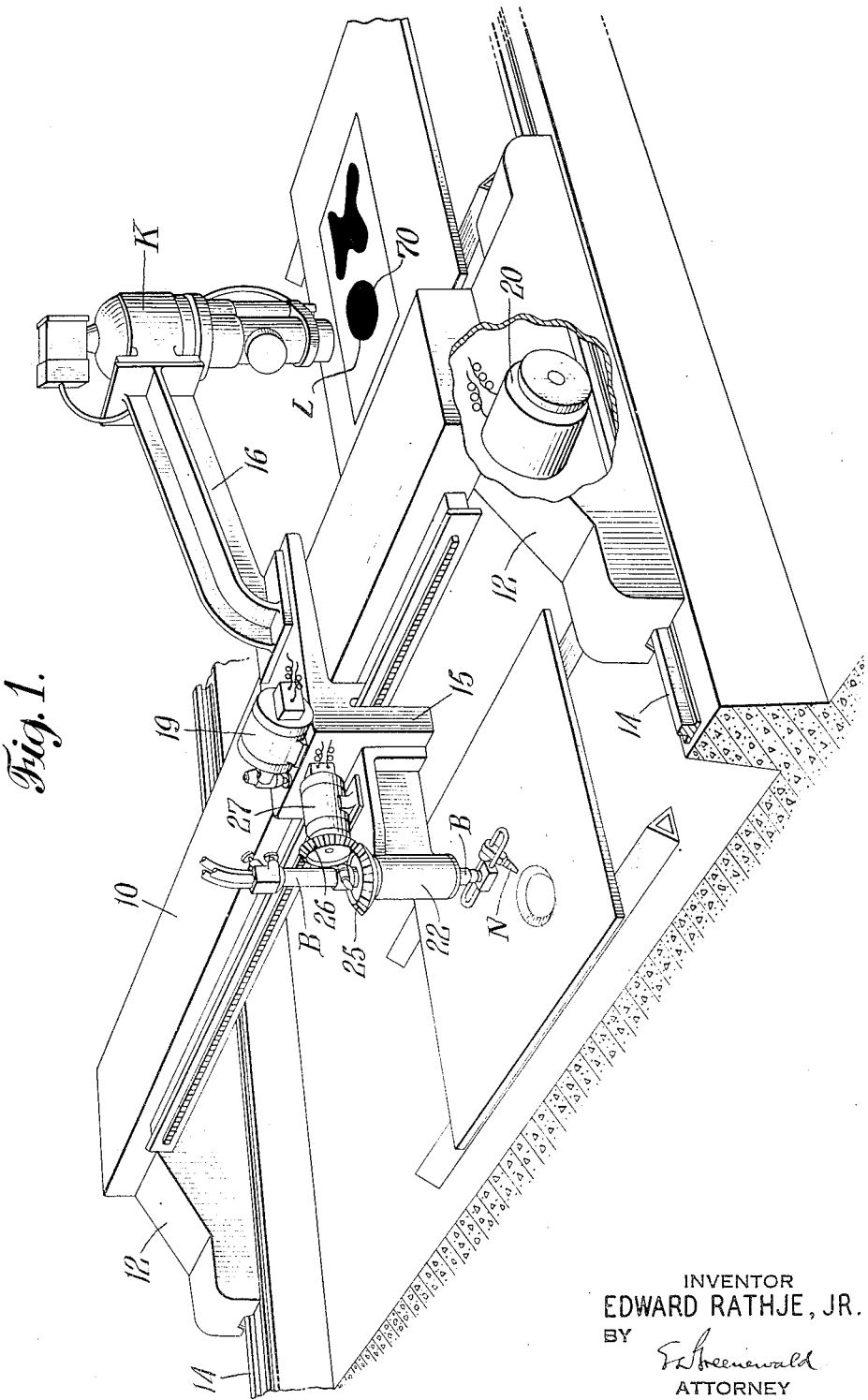

2,508,468

UNITED STATES PATENT OFFICE 2,508,468

CONTOUR REPRODUCTION

Edward Rathje, Jr., Cranford, N. J., assignor to The Linde Air Products Company, a corporation of Ohio Application June 19, 1946, Serial No. 677,806

17 Claims. (Cl. 148—9)

This invention relates to contour reproduction, and more particularly to method and apparatus employing a photoelectric cell or other radiant energy responsive device for tracing the line to be reproduced, and mechanism responsive to the photoelectric cell for moving a reproducing unit in the proper direction to reproduce the contour.

In the Fowle and Kennedy Patent No. 2,397,933 the tracing or master mechanism generates voltages which are related in space quadrature, which voltages are respectively conducted to the drive motors of a milling machine. Inasmuch as the milling cutter rotates, it presents the same cutting front in all directions, and hence no orientation or steering of the milling cutter is provided. However, in operations or adaptations such as bevel cutting with the oxyfuel blowpipe, or shape cutting operations employing a steerable traction wheel as a reproducing unit or follower, or indicating devices having a pivoted pointer, it is desirable to orient or steer the reproducing or follower unit or pointer.

It is therefore the main object of the present invention to employ voltages related in space quadrature generated by a master or tracing mechanism for orienting or steering a reproducing or follower unit.

An example of a bevel cutting operation is disclosed in the Dodge Patent No. 1,978,042. The bevel cutting blowpipe is mechanically geared to the steered traction wheel so as to maintain the plane of inclination of the blowpipe always normal to the contour. But in the Fowle and Kennedy machine there is no steered unit to which a bevel cutting blowpipe could be so geared.

It is therefore a particular object of the present invention to utilize master voltages related in space quadrature for maintaining the plane of inclination of a bevel cutting blowpipe at all times normal to the contour.

An example of the steerable traction wheel for shape cutting operations is disclosed in the Young Patent No. 2,172,313, in which a photoelectric tracing device is employed for energizing the reversible steering motor for the traction wheel. Upon increase of light, contacts are closed which impose the line voltage upon the armature of the steering motor, and upon decrease of light impose the line voltage upon the steering motor in the reverse direction. There is nothing in this arrangement to utilize the master voltages related in space quadrature of the Fowle and Kennedy development.

Other objects and features of novelty will be apparent as the following description proceeds, with reference to the accompanying drawings, in which Fig. 1 is a perspective view of a shape cutting machine according to, and for carrying out the method of, the present invention; and Fig. 2 is a wiring diagram of the electrical apparatus employed in Fig. 1.

In the Fowle and Kennedy patent, particularly in the photoelectric tracing device, the light passes through a rotating shutter having a circular opening with an eccentric notch, which rotates into overlapping relation with the contour line to be traced, and energizes a photoelectric cell or tube. Also rotating with the shutter is a shoe in series with the photoelectric cell, which contacts in succession four segments. These segments transmit control voltages in space quadrature to four coils respectively in series with the segments.

In lieu of the shoe and segment device, a synchronous motor is employed to rotate the shutter, and the successive phases of a four phase power circuit are distributed to four thermionic tubes having control circuits including the photoelectric cell, so that the control voltages related in space quadrature may be taken off from the respective tubes.

According to the present invention, in order to utilize the control voltages related in space quadrature for turning a follower device about an axis, a positioning motor is provided which does not normally rotate at uniform speed, but rotates to an angular position with respect to the stator determined by the relative magnitude and polarity of two separate direct current control voltages. This motor has a two pole rotor, utilizing either a permanent magnet or a direct current winding to produce the magnetic field of the rotor, and a stator with two separate windings placed ninety degrees apart on the stator and excited by the two individual control voltages. The construction of the rotor and stator may be interchanged without changing the operation of the motor. Each stator winding produces a magneto-motive force proportional to the control voltage impressed across the coil. Since the two windings are displaced ninety degrees in space from each other, the two magneto-motive forces will be at right angles to each other and will add vectorially to produce a resultant stator magneto-motive force, thereby establishing the direction of field flux. The stator and rotor are in effect two magnets, and as such a torque is produced between them tending to rotate the rotor until such increases and decreases in accordance with changes in direction of the contour; generating voltages related in quadrature proportion to the changes in the amounts of such increases and decreases, and employing said generated voltages in a motor for swinging a reproducing unit about an axis while maintaining said unit in non-parallel relation to said axis in electrical response to the vectorial sum of such voltages to maintain the reproducing unit centered in a plane normal to the contour being reproduced.

5. Method of reproducing a contour, which comprises relatively moving a contour and a tracer longitudinally of the contour in intercepting relation, generating voltages in space quadrature proportional to changes in direction of the contour to be reproduced, and employing said generated voltages in a motor for swinging a reproducing unit about an axis while maintaining said unit in non-parallel relation to said axis in electrical response to the vectorial sum of said voltages to change the direction of the reproducing action.

6. Method of reproducing a contour, which comprises photoelectrically tracing said contour, generating voltages related in space quadrature responsive to said photoelectric tracing step and proportional to changes in direction of the contour, and employing said voltages for swinging a reproducing unit about an axis while maintaining said unit in non-parallel relation to said axis in electrical response to the vectorial sum of said voltages to change the direction of the reproducing action.

7. Method of reproducing a contour and providing a beveled edge for the reproduced contour, which comprises generating voltages in space quadrature proportional to changes in direction of the contour to be reproduced, and swinging a bevel cutting blowpipe about an axis in electrical response to the vectorial sum of said voltages to maintain the cutting jet in a plane normal to the contour being reproduced.

8. Method of reproducing a contour, which comprises generating voltages in space quadrature proportional to changes in the contour to be reproduced, moving a reproducing axis in response to the vectorial sum of said voltages to change the direction of movement of said axis, and swinging a bevel cutting blowpipe about said axis in electrical response to said vectorial sum to maintain the cutting jet in a plane normal to the contour being reproduced.

9. Apparatus for reproducing a contour, which comprises a tracing mechanism for relatively moving a contour and a tracer into alternately increasing and decreasing overlapping relation and varying the amounts of such increases and decreases in accordance with changes in direction of the contour; voltage generating mechanism cooperating with said tracing mechanism for generating voltages in quadrature proportional to such increases and decreases; and a motor receiving said generated voltages for swinging a reproducing unit about an axis while maintaining said unit in non-parallel relation to said axis in electrical response to the changes in the amounts of such increases and decreases.

10. Apparatus for reproducing a contour, which comprises a tracing mechanism for relatively moving a contour and a tracer into alternately increasing and decreasing overlapping relation and varying the amounts of such increases and decreases in accordance with changes in direction of the contour; voltage generating mechanism cooperating with said tracing mechanism for generating voltages related in space quadrature proportional to changes in direction of the contour to be reproduced, and a motor having coils receiving said generated voltages for swinging a reproducing unit about an axis while maintaining said unit in non-parallel relation to said axis in electrical response to the vectorial sum of said voltages to change the direction of the reproducing action.

11. Apparatus for reproducing a contour, which comprises a photoelectric cell and a tracing mechanism cooperating therewith for photoelectrically tracing said contour, voltage generating mechanism cooperating with said tracing mechanism and photoelectric cell for generating voltages related in space quadrature in response to said photoelectric tracing and proportional to changes in direction of the contour, and a motor having coils receiving said generated voltages for employing said voltages for swinging a reproducing unit about an axis while maintaining said unit in non-parallel relation to said axis in electrical response to the vectorial sum of said voltages to change the direction of the reproducing action.

12. Apparatus for reproducing a contour and providing a beveled edge for the reproduced contour, which comprises a tracing mechanism and voltage generating mechanism cooperating therewith for generating voltages related in space quadrature proportional to changes in direction of the contour to be reproduced and a motor having coils receiving said generated voltages for swinging a bevel cutting blowpipe about an axis in electrical response to the vectorial sum of said voltages to maintain the cutting jet in a plane normal to the contour being reproduced.

13. Apparatus for reproducing a contour, which comprises tracing mechanism and voltage generating mechanism cooperating therewith for generating voltages related in space quadrature proportional to changes in the contour to be reproduced, motors receiving said generated voltages for moving a reproducing unit having an axis in response to the vectorial sum of said voltages to change the direction of movement of said axis, and a magnetomotive device having coils receiving said generated voltages for swinging a bevel cutting blowpipe about said axis in electrical response to said vectorial sum to maintain the cutting jet in a plane normal to the contour being reproduced.

14. In a contour reproducing machine, a tracing mechanism adapted to move along a contour and follow change in direction thereof, a master unit adapted to generate voltages related in space quadrature proportional to change in direction of the contour to be reproduced, a reproducing unit adapted to swing about an axis in non-parallel relation thereto to change the direction of reproducing action, and a magnetomotive device receiving said voltages from said master unit for swinging said reproducing unit about its axis in response to the vectorial sum of said voltages.

15. In a contour reproducing machine, a tracing unit adapted to follow a contour and to generate voltages related in space quadrature in response to changes in direction of the contour being traced, a reproducing unit adapted to swing about an axis in non-parallel relation thereto to change the direction of reproducing action, and a magnetomotive device having coils in a circuit receiving said voltages from said tracing unit for swinging said reproducing unit about its axis in response to the vectorial sum of said voltages.

16. Apparatus for reproducing a contour, comprising a main carriage movable in a longitudinal direction, a cross carriage movable on said main carriage in a transverse direction, a radiant energy tracer unit mounted on said cross carriage and provided with a voltage generating device to generate voltages related in space quadrature proportional to changes in the direction of the contour to be reproduced, a reproducing unit pivotally mounted on said cross carriage to swing about a vertical axis in non-parallel relation thereto, and a motor having coils in a circuit receiving said voltages from said tracer unit for swinging said reproducing unit about said vertical axis in response to the vectorial sum of said voltages.

17. Apparatus for reproducing a contour, comprising a main carriage movable in a longitudinal direction, a cross carriage movable on said main carriage in a transverse direction, a radiant energy tracer unit mounted on said cross carriage and cooperating with a voltage generating device to generate voltages related in space quadrature proportional to changes in direction of the contour to be reproduced, a reproducing unit pivotally mounted on said cross carriage to swing about a vertical axis in non-parallel relation thereto, motors responsive to said respective voltages for driving said carriages, and a magnetomotive device responsive to the vectorial sum of said voltages for swinging said reproducing unit about said vertical axis.

EDWARD RATHJE, Jr.

REFERENCES CITED

The following references are of record in the file of this patent:

UNITED STATES PATENTS

| Number | Name | Date |
|---|---|---|
| 1,347,695 | Gillespie | July 27, 1920 |
| 1,747,664 | Droitcour | Feb. 18, 1930 |
| 2,087,678 | Wagner | July 20, 1937 |
| 2,172,313 | Young | Sept. 5, 1939 |
| 2,187,613 | Nichols | Jan. 16, 1940 |
| 2,194,909 | Moss et al. | Mar. 26, 1940 |
| 2,228,090 | Smith | Jan. 7, 1941 |
| 2,261,644 | Cockrell | Nov. 4, 1941 |
| 2,269,643 | Bechtle | Jan. 13, 1942 |
| 2,303,473 | Jones | Dec. 1, 1942 |
| 2,397,933 | Fowle et al. | Apr. 4, 1946 |

FOREIGN PATENTS

| Number | Country | Date |
|---|---|---|
| 417,663 | Great Britain | Oct. 8, 1934 |